Patented Sept. 29, 1953

2,653,982

UNITED STATES PATENT OFFICE 2,653,982

CATALYTIC ALKYLATION OF ISOPARAFFINS WITH OLEFINS

Robert M. Kennedy, Newtown Square, and Conard K. Donnell, Springfield, Pa., assignors to Sun Oil Company, Philadelphia, Pa., a corporation of New Jersey No Drawing. Application March 30, 1951,
Serial No. 218,530

21 Claims. (Cl. 260—683.4)

This invention relates to the preparation of branched chain paraffins by the alkylation of an isoparaffin having at least one tertiary carbon atom per molecule with an olefin under novel catalytic conditions, and is especially applicable to the preparation of 2,3-dimethylbutane by the alkylation of isobutane with ethylene.

It is well known that branched chain paraffins may be prepared by alkylating isoparaffins with olefins, and such products have become increasingly important in recent years as additives for the preparation of high quality fuels for spark ignition engines due to their high antiknock qualities and good volatility. They have high octane ratings and excellent rich-mixture response, which renders them especially useful for preparing high quality aviation fuels.

Catalysts heretofore proposed for alkylation reactions, such as the alkylation of isobutane with ethylene, include for example, aluminum chloride with a promoter such as HCl, $BF_3$—$H_2O$—Ni complexes and $BF_3$—$H_2O$—HF complexes. Such catalytic materials are insoluble in hydrocarbons or are soluble only to a limited extent. When such catalysts are employed in conducting the reaction, it is therefore necessary to effect intimate contact between the hydrocarbon phase and catalyst phase, and usually a mechanically agitated reactor is provided for continuously agitating the reactants and catalyst during this period. This adds considerably to the expense of the operation with respect both to installation charges and operating costs.

The alkylation of isoparaffins with olefins under the catalytic influence of an admixture of $BF_3$ and an alkyl fluoride is described and claimed in patent application Serial Number 38,167, filed July 10, 1948, now Patent No. 2,557,113, and the alkylation of isobutane with ethylene under the same catalytic influence to form 2,3-dimethylbutane is specifically described and claimed in patent application Serial Number 49,447, filed September 15, 1948, now Patent No. 2,557,114. In patent application Serial Number 32,982, filed June 14, 1948, now abandoned, there is described and claimed the process of preparing a primary alkyl fluoride by reacting a tertiary alkyl fluoride with ethylene in the presence of $BF_3$, preferably in the presence of a diluent, such as isobutane. As described in the latter patent application, the combination of a tertiary alkyl fluoride and $BF_3$ when brought together in contact with an admixture of ethylene and isobutane, produces a primary alkyl fluoride when the temperature of reaction is below about —20° C., whereas products of alkylation predominate at higher temperatures. With primary and secondary fluorides, the alkylation reaction is described as predominating at all operable temperatures.

A method of operation whereby alkylation is made the predominant reaction in the system: isoparaffin-olefinalkyl fluoride-$BF_3$, over the temperature range of —120° C. to 150° C. has now been found. It has been further found that the present process substantially eliminates from the reaction product hydrocarbons boiling above the gasoline range such as characterize many of the prior alkylation processes and the process described in patent application Serial Number 49,447, and that the yield of the desired alkylated product is greatly enhanced.

It has now been found that in reacting an isoparaffin having at least one tertiary carbon atom per molecule with an olefin in the presence of a catalyst comprising an admixture of $BF_3$ and an alkyl fluoride having at least two carbon atoms per molecule, if a quantity of $BF_3$ above a critical minimum, as hereinafter described, is employed, the olefin alkylates the isoparaffin to form a reaction mixture containing substantially no fluorides or high boiling hydrocarbons. The components constituting the catalyst are an alkyl fluoride and $BF_3$, both of which are soluble in the reactants at least in the concentrations employed, so that reaction does not depend upon contact between two separate phases, i. e., reaction is effected in homogeneous phase.

While the process of the present invention is broadly applicable to the alkylation of isoparaffins with olefins, as hereinafter defined, the process is conveniently described in terms of a preferred embodiment thereof, which is the alkylation of isobutane with ethylene to produce 2,3-dimethylbutane.

The process of the invention comprises bringing together an alkyl fluoride and $BF_3$ in the presence of isobutane and ethylene at a temperature of from —120° C. to 150° C., whereby a catalytic condition becomes established that causes the alkylation reaction to take place immediately. In bringing together the alkyl fluoride and $BF_3$, the alkyl fluoride can be introduced into a mixture of the reactants to which $BF_3$ has already been added, or the $BF_3$ can be introduced into a solution of the alkyl fluoride in the reactants, or both of the catalytic components can be introduced simultaneously but separately into the reactants. It is also permissible first to dissolve one of the catalytic components in either the isobutane or ethylene and the other catalytitc component in the other reactant and then bring together the separate mixtures to effect reaction. It is not permissible, however, to premix the alkyl fluoride and BF₃ and then add the mixture to the hydrocarbons, for in such case the catalytic condition will be immediately spent when the alkyl fluoride and BF₃ are brought into contact with each other. Also, when an olefin other than ethylene is used, BF₃ should not be dissolved therein since polymerization of the olefin may occur.

As above stated, it is essential to the successful operation of the present invention that the quantity of BF₃ employed be above a minimum critical value. It is of primary importance that the mole ratio of BF₃ to alkyl fluoride be above 1 and it preferably is within the range of from 1 to 10, although higher ratios may be used. The mole ratio of BF₃ to olefin should be above 0.1, and preferably is within the range of from 0.1 to 10 although higher ratios may be used. The mole ratio of olefin to alkyl fluoride should be from 1 to 10. For example, in the preferred embodiment, where 1 mole of ethylene is employed, from 5 to 10 moles of isobutane, from 0.1 to 1 mole of alkyl fluoride, and from 0.1 to 10 moles of boron fluoride give good results. In general, the amount of BF₃ should be at least 7 mole percent of the total reaction mixture in order to achieve good resutls, and preferably is from 7 to 50 mole percent. When less than the stated quantity of BF₃ is employed, the reactions of aforementioned patent applications Serial Numbers 49,447 and 32,982 occur, depending upon the alkyl fluoride and temperature employed.

The alkyl fluoride employed should have at least two carbon atoms per molecule. It may be a primary fluoride (i. e. one having the fluorine atom attached to a primary carbon atom), a secondary fluoride (i. e. where the fluorine atom is attached to a secondary carbon atom) or a tertiary fluoride (i. e. where the fluorine atom is attached to a tertiary carbon atom). Any primary, secondary or tertiary alkyl fluoride, other than methyl fluoride, is operative in combination with BF₃ to promote the alkylation of isobutane and ethylene to form 2,3-dimethylbutane.

As specific examples of primary fluorides which may be used in practicing the process, the following may be mentioned by way of illustration: ethyl fluoride; n-propyl fluoride; n-butyl fluoride; isobutyl fluoride; n-amyl fluoride; isoamyl fluoride; 1-fluoro-2-methylbutane; n-hexyl fluoride; and similar fluoride derivatives of hexanes, heptanes, octanes or the like. As specific illustrations of secondary fluorides, the following may be mentioned: isopropyl fluoride; 2-fluoro-butane; 2-fluoro-3-methylbutane; and 2-fluoro-3,3-dimethylbutane. A few specific examples of tertiary fluorides are: t-butyl fluoride; t-amyl fluoride; 2-fluoro-2,3-dimethylbutane and other t-hexyl fluorides; t-heptyl fluorides; and 4-fluoro-2,2,4-trimethylpentane and other t-octyl fluorides. It will be understood that the specific compounds named above are given merely by way of illustration and that any alkyl fluoride (with the excepttion of methyl fluoride) will produce an operative catalytic combination with BF₃ provided the temperature is above the minimum value as set forth above.

The alkyl fluoride is converted in the reaction, at least in part, to the corresponding hydrocarbon. Thus, if t-butyl fluoride is employed isobutane is formed and may enter into the reaction, whereas if isopropyl fluoride is employed, propane is formed and does not enter into the reaction. Where the fluoride employed is converted to a hydrocarbon which may enter into the reaction, it is of advantage to employ the fluoride corresponding to the hydrocarbon being alkylated, e. g. t-butyl fluoride is advantageously used when isobutane is the isoparaffin being alkylated.

The process of the present invention is preferably performed at temperatures of from −120° C. to 150° C., and the above-mentioned primary, secondary, and tertiary alkyl fluorides are operable within such temperature range. If desired, higher temperatures may be employed, so long as the reaction mixture is maintained in the liquid phase.

In alkylation processes generally, some reactions other than straight alkylation of the isoparaffin with the olefin invariably occur along with the main alkylation reaction. Usually such other reactions produce high boiling, high molecular weight hydrocarbons, such as hydrocarbons having at least 9 carbon atoms per molecule, and an advantage of the present process is the substantial elimination of such high boiling products. Thus, under preferred conditions of operation, the production of such high boiling products is less than 5%. In the preferred embodiment wherein isobutane is alkylated with ethylene under preferred conditions, 2,3-dimethylbutane is the principal product and is the only hydrocarbon having 6 carbon atoms per molecule found in the reaction mixture. Hence, the 6 carbon atom fraction, which may be separated by conventional fractionation, exhibits the engine performance characteristics of pure 2,3-dimethylbutane. Another hydrocarbon produced in smaller but substantial quantities is 2,2,4-trimethylpentane, which is formed by the self-alkylation of isobutane. Only very minor amounts of other octanes are formed, a small amount of 2,3,3-trimethylpentane and 2,3,4-trimethylpentane being observed. No 2,3-dimethylpentane, 2,4-dimethylpentane, isopentane or neohexyl fluoride is observed, as demonstrated by the following examples. The present reaction mixture is especially advantageous in the preparation of motor fuels, since 2,3-dimethylbutane or isooctane, or a mixture thereof, may be easily obtained in an unusually high state of purity. By way of contrast, heretofore known processes for alkylating isobutane with ethylene generally yield 2,3-dimethylbutane in admixture with substantial amounts of other hexanes and other hydrocarbons of inferior antiknock value.

The present process has been described, for purposes of illustration, principally in terms of the preferred embodiment, the alkylation of isobutane with ethylene. Other isoparaffins having at least one tertiary carbon atom per molecule and other olefins may be employed. The following isoparaffins illustrate those which may be employed in the present process: isopentane; 2-methylhexane; 3-methylhexane; 2,3-dimethylhexane; 2-methylheptane; 3-methylheptane; and 2,3-dimethylheptane. The following olefins illustrate those which may be employed in the present process: propylene; butene-1; butene-2; isobutene; 2-methylbutene-2; pentene-1; pentene-2; 2-methylpentene-2; hexene-1; and hexene-2. Since an object of the present invention is to provide a process for the preparation of hydrocarbons suitable as fuel or as fuel components for spark ignition internal combustion engines, it is preferred to employ a combination of an isoparaffin and olefin which gives a product having ten carbon atoms or less. For example, the alkylation of isobutane with olefins having not more than 6 carbon atoms, or of isopentane with olefins having not more than 5 carbon atoms, and the like, is preferred. Especially valuable hydrocarbons are prepared by alkylating isobutane with propylene to form 2,3- and 2,4-dimethylpentane; by alkylating isobutane with butene-1 to form 2,3- and 2,4-dimethylhexane; and by alkylating isobutane with butene-2 to form trimethylpentanes including 2,2,4-, 2,2,3-, and 2,3,4-trimethylpentane.

As above stated, it is essential to the successful operation of the present process for the preparation of branched chain paraffins by reacting an isoparaffin with an olefin in the presence of an admixture of $BF_3$ and an alkyl fluoride that the quantity of $BF_3$ employed be above a critical minimum value, and it is further essential that the alkyl fluoride and $BF_3$ be contacted only in the presence of both the isoparaffin and the olefin. In the preferred embodiment wherein $BF_3$ is introduced into an admixture of alkyl fluoride, isoparaffin and olefin, it is permissible to introduce the entire quantity of $BF_3$ at one time, or to introduce successive quantities. The latter method is preferred especially in low temperature operations, say below about 0° C., since temperature control of the exothermic reaction is thereby more easily maintained. In this method of operation is it believed that with the initial addition of $BF_3$ an instantaneous reaction occurs involving the formation of a primary alkyl fluoride, or high boiling hydrocarbons, or both. On subsequent additions of $BF_3$, after the critical minimum is reached, further reaction is induced so that the products of the initial stage are converted to the products of the present process. When the entire quantity of $BF_3$ is added at one time, or is present in the initial admixture, the present products appear to be formed instantaneously, i. e., the reaction is complete as soon as the reactants are mixed.

While it appears that the alkylation reaction occurs in homogeneous phase, the reaction mixture becomes heterogeneous due to the separation of a small amount of a sludge from the hydrocarbon phase. The sludge contains fluorine derived from the alkyl fluoride together with $BF_3$ in some sort of complex form, and is readily separated from the reaction mixture such as by decanting or centrifuging. If desired, $BF_3$ can be recovered from the sludge for reuse. This can be accomplished by heating to drive off $BF_3$ and HF, and recovering $BF_3$ from the evolved vapors by fractional distillation.

The following example illustrates a specific embodiment of the invention:

*Example*

The following runs (A, B, and C) were made at —80° C. using t-butyl fluoride as the alkyl fluoride in each run. The procedure in runs A and B was to charge the isobutane, ethylene and t-butyl fluoride into a contactor provided with a stirrer and then introduce $BF_3$ in increments of 0.1 mole by bubbling it into the mixture. After each addition of $BF_3$, the temperature was adjusted to —80° C. In run C the alkyl fluoride was added to a mixture of the other reactants. After completion of the additions, the lower layer was separated and the reaction mixture subjected to distillation.

The following table shows the components, conditions, and products of the process:

| | Run A | Run B | Run C |
|---|---|---|---|
| Reaction temperature (°C.) | —80 | —80 | —80 |
| Charge: | | | |
| isobutane (moles) | 1.99 | 1.966 | 2.34 |
| ethylene (moles) | 0.408 | 0.387 | .876 |
| t-butyl fluoride (moles) | 0.207 | 0.207 | .290 |
| $BF_3$ (moles) | 0.10 | 0.30 | .059 |
| $BF_3$ (mole percent total reaction mixture) | 3.7 | 10.5 | 1.70 |
| Mole ratio: | | | |
| $BF_3$/alkyl fluoride | 0.483 | 1.45 | .203 |
| $BF_3$/olefin | 0.245 | 0.775 | .075 |
| olefin/alkyl fluoride | 2 | 1.9 | 2.7 |
| Products (as determined by intra-red analysis): | | | |
| neohexyl fluoride (moles) | 0.13 | 0 | .118 |
| isopentane (moles) | 0 | 0 | 0 |
| 2,3-dimethylbutane (moles) | 0.03 | 0.206 | .03 |
| dimethylpentanes (moles) | 0 | 0 | ------ |
| 2,2,4-trimethylpentane (moles) | 0 | 0.068 | .012 |
| 2,3,3-trimethylpentane (moles) | 0 | 0.003 | ------ |
| 2,3,4-trimethylpentane (moles) | 0 | 0.009 | ------ |
| 2,3-dimethylhexane (moles) | 0 | 0 | .029 |
| Yields: | | | |
| 2,3-dimethylbutane, based on fluoride consumed (percent) | 14 | 100 | ------ |
| neohexyl fluoride, based on fluoride consumed (percent) | 63 | 0 | ------ |
| Percent boiling below 204° C. | ------ | 96.5 | ------ |
| Percent boiling below 130° C. | ------ | 91 | 61 |

It will be observed that the quantity of $BF_3$ used in runs A and C was below the critical value herein described, and that neohexyl fluoride was a principal product of these reactions. It will be further observed that the product of run B boils almost entirely within the gasoline range. Thus, while 91% of the product of run B boiled below 130° C., and 96.5% boiled below 204° C., only 61% of the product of run C boiled below 130° C.

The invention claimed is:

1. Method of preparing branched chain paraffins which comprises reacting, at a temperature of from —120° C. to 150° C., an isoparaffin and an olefin in the presence of a catalyst comprising an admixture of $BF_3$ and an alkyl fluoride having at least two carbon atoms per molecule, said admixture being prepared in the presence of said isoparaffin and said olefin, wherein the mole ratio of $BF_3$ to said alkyl fluoride is from 1 to 10 and wherein the amount of $BF_3$ is at least 7 mole percent of the reaction mixture.

2. Method according to claim 1 wherein the alkyl fluoride is a tertiary alkyl fluoride.

3. Method according to claim 1 wherein the alkyl fluoride is t-butyl fluoride.

4. Method according to claim 1 wherein the alkyl fluoride is a secondary alkyl fluoride.

5. Method according to claim 1 wherein the alkyl fluoride is isopropyl fluoride.

6. Method according to claim 1 wherein the alkyl fluoride is a primary alkyl fluoride.

7. Method according to claim 1 wherein the alkyl fluoride is isobutyl fluoride.

8. Method of preparing 2,3-dimethylbutane by the alkylation in homogeneous phase of isobutane with ethylene which comprises reacting, at a temperature of from —120° C. to 150° C., isobutane and ethylene in the presence of a catalyst comprising an admixture of $BF_3$ and an alkyl fluoride having at least two carbon atoms per molecule, said admixture being prepared in the presence of said isobutylene and said ethylene, wherein the mole ratio of $BF_3$ to said alkyl fluoride is from 1 to 10 and wherein the amount of $BF_3$ is at least 7 mole percent of the reaction mixture.

9. Method according to claim 8 wherein the alkyl fluoride is a tertiary alkyl fluoride.

10. Method according to claim 8 wherein the alkyl fluoride is t-butyl fluoride.

11. Method according to claim 8 wherein the alkyl fluoride is a secondary alkyl fluoride.

12. Method according to claim 8 wherein the alkyl fluoride is isopropyl fluoride.

13. Method according to claim 8 wherein the alkyl fluoride is a primary alkyl fluoride.

14. Method of preparing dimethyl pentanes by the alkylation in homogeneous phase of isobutane with propylene which comprises reacting, at a temperature of from —120° C. to 150° C., isobutane and propylene in the presence of a catalyst comprising an admixture of $BF_3$ and an alkyl fluoride having at least two carbon atoms per molecule, said admixture being prepared in the presence of said isobutane and said propylene, wherein the mole ratio of $BF_3$ to said alkyl fluoride is from 1 to 10 and wherein the amount of $BF_3$ is at least 7 mole percent of the reaction mixture.

15. Method according to claim 14 wherein the alkyl fluoride is t-butyl fluoride.

16. Method of preparing dimethyl hexanes by the alkylation in homogeneous phase of isobutane with butene-1 which comprises reacting, at a temperature of from —120° C. to 150° C., isobutane and butene-1 in the presence of a catalyst comprising an admixture of $BF_3$ and an alkyl fluoride having at least two carbon atoms per molecule, said admixture being prepared in the presence of said isobutene and said butene-1, wherein the mole ratio of $BF_3$ to said alkyl fluoride is from 1 to 10 and wherein the amount of $BF_3$ is at least 7 mole percent of the reaction mixture.

17. Method according to claim 16 wherein the alkyl fluoride is t-butyl fluoride.

18. Method of preparing trimethylpentanes by the alkylation in homogeneous phase of isobutane with butene-2 which comprises reacting, at a temperature of from —120° C. to 150° C., isobutane and butene-2 in the presence of a catalyst comprising an admixture of $BF_3$ and an alkyl fluoride having at least two carbon atoms per molecule, said admixture being prepared in the presence of said isobutane and said butene-2, wherein the mole ratio of $BF_3$ to said alkyl fluoride is from 1 to 10 and wherein the amount of $BF_3$ is at least 7 mole percent of the reaction mixture.

19. Method according to claim 18 wherein the alkyl fluoride is t-butyl fluoride.

20. Method of preparing branched chain paraffins which comprises reacting an isoparaffin and an olefin in the liquid phase at a temperature above —120° C. in the presence of a catalyst comprising an admixture of $BF_3$ and an alkyl fluoride having at least two carbon atoms per molecule, said admixture being prepared in the presence of said isoparaffin and said olefin, wherein the mole ratio of $BF_3$ to said alkyl fluoride is from 1 to 10 and wherein the amount of $BF_3$ is at least 7 mole percent of the reaction mixture.

21. Method of preparing 2,3-dimethylbutane by the alkylation and homogeneous phase of isobutane with ethylene, which comprises introducing, at a temperature of about —80° C., $BF_3$ into an admixture of isobutane, ethylene, and tertiary butyl fluoride, wherein the mole ratio of $BF_3$ to tertiary butyl fluoride is from 1 to 10 and wherein the amount of $BF_3$ is at least 7 mole percent of the reaction mixture.

ROBERT M. KENNEDY.
CONARD K. DONNELL.

References Cited in the file of this patent

UNITED STATES PATENTS

| Number | Name | Date |
| --- | --- | --- |
| 2,557,113 | Kennedy et al. | June 19, 1951 |
| 2,557,114 | Kennedy et al. | June 19, 1951 |
| 2,557,115 | Kennedy et al. | June 19, 1951 |
| 2,557,118 | Kennedy et al. | June 19, 1951 |